United States Patent [11] 3,581,985

| [72] | Inventors | John Bjarni Thorsteinsson;<br>Herbert Torrence Hazleton; James Welland Dalzell, all of Brandon, Manitoba, Canada |
|---|---|---|
| [21] | Appl. No. | 530,485 |
| [22] | Filed | Feb. 28, 1966 |
| [45] | Patented | June 1, 1971 |
| [73] | Assignee | Pioneer Electric (Brandon) Limited<br>Brandon, Manitoba, Canada |
| [32] | Priority | Mar. 8, 1965 |
| [33] | | Canada |
| [31] | | 925,035 |

[54] METHOD AND APPARATUS FOR MINIMUM DROOP OR RISE AND DIFFERENTIAL THERMOSTATIC TEMPERATURE CONTROL OF HEATING EQUIPMENT
9 Claims, 2 Drawing Figs.

[52] U.S. Cl. ................................................ 236/68,
219/511, 337/100
[51] Int. Cl. .............................................. G05d 23/30
[50] Field of Search .......................................... 236/68, 68
B; 200/122, 138 X, 138.2, 139.3; 307/116;
219/511, 512; 337/378, 100

[56] References Cited
UNITED STATES PATENTS

| 1,885,053 | 10/1932 | Slough | 236/68 |
|---|---|---|---|
| 2,121,582 | 6/1938 | Bletz | 200/139 |
| 2,209,768 | 7/1940 | Dillman | 236/68 |
| 2,334,447 | 11/1943 | Shaw | 236/68 |
| 2,628,034 | 2/1953 | Ray | 236/68 |
| 2,969,917 | 1/1961 | Nason | 236/91 |
| 3,352,490 | 11/1967 | Dalzell et al. | 236/68 |
| 2,732,132 | 1/1956 | Hulett | 236/68X |
| 3,111,010 | 11/1963 | Spofford | 236/68X |
| 3,157,801 | 11/1964 | Shequen | 236/68 |
| 3,196,685 | 7/1965 | Leigh et al. | 73/362.4 |
| 3,284,002 | 11/1966 | Edelman et al. | 236/1 |

*Primary Examiner*—William E. Wayner
*Attorneys*—Paul S. Martin and Richard M. Rabkin ABSTRACT: Thermostats are provided which are useful both for heating and for cooling equipment having a minimum droop characteristic. The described thermostat includes a snap switch in series with the heating or cooling equipment and the load current flowing through the switch to the equipment develops heat in the switch. Droop is minimized by introducing a shield between the switch and the temperature-sensing bimetal, there being an air space both in front of the shield and behind the shield, and the shield having a bright reflecting surface directed toward the switch. Additionally, a heater is provided that is energized during the time intervals when the load is turned off and heating in the switch stops. The overall heating effect resulting from the switch and the heater can be maintained at an approximate norm without regard to the percentage "on" time of the switch so that a minimum droop or even a rise characteristic can be realized.

PATENTED JUN 1 1971 3,581,985
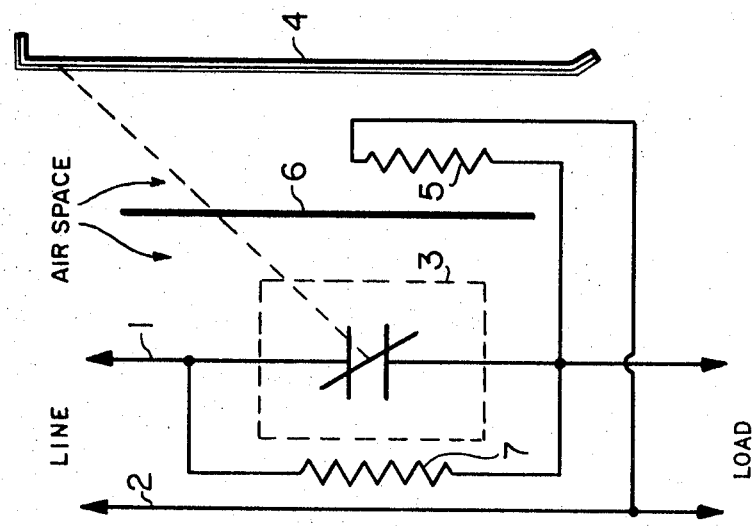
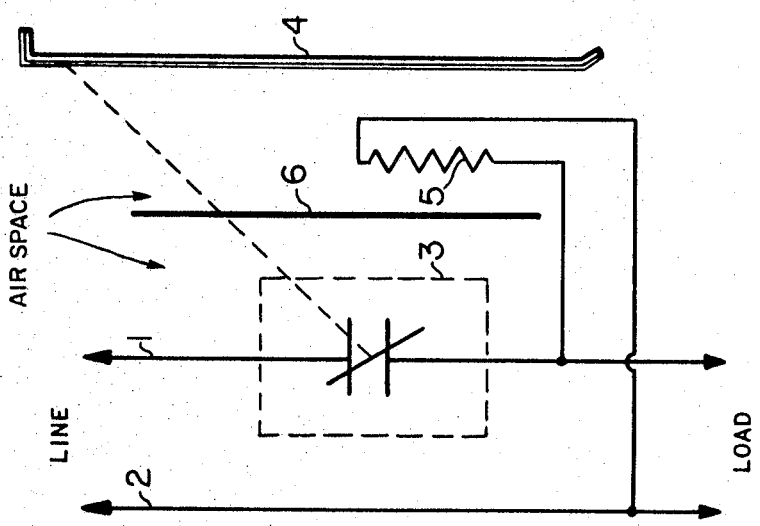
INVENTORS
JOHN BJARNI THORSTEINSSON
HERBERT TORRENCE HAZLETON
BY JAMES WELLAND DALZELL
*Richard M. Rabkin*
ATTORNEY

3,581,985

METHOD AND APPARATUS FOR MINIMUM DROOP OR RISE AND DIFFERENTIAL THERMOSTATIC TEMPERATURE CONTROL OF HEATING EQUIPMENT

This invention relates to a method and apparatus for minimum droop or rise and differential thermostatic temperature control of heating equipment.

In the art of electrical thermostats there has been a consistent demand for thermostats which not only maintain selected temperatures within the closest possible tolerances but which also compensate for the thermal inertia of the heated or cooled air, of the building structure surrounding such air and of the heating or cooling equipment.

It is customary to describe the characteristics of such thermostats at least in terms of operating differential and droop or rise. Operating differential is the difference in temperature between the cut-in and cutout points. Droop or rise is a deviation from the no-load control point which results from a change in the heating or cooling load.

Droop is an objectionable characteristic of so-called line-voltage thermostats when used (for example) to control electric room heaters. In that application, droop results when heat is developed in a switching device forming part of the thermostat, where this heat results from load current flowing through the switching device to electric room heaters. Some part of the heat of the switch is transmitted to the temperature sensor of the thermostat and causes the temperature sensor to "see" a high ambient temperature than that of the air in the room. When the thermostat supplies current to the heating equipment, the control point of a line-voltage thermostat is lower than the no-load control point by an amount called "droop." The amount of droop that occurs increases at a greater-than-linear rate with increase in heat developed in the switching device resulting from the load current through it.

The droop increases with increase of load currents. The droop is also greater for heating conditions that result in relatively long "on" times and short "off" times of equipment energization than for conditions of short "on" times and long "off" times. Since the actual control point of the thermostat cannot be determined by the occupant of the room due to the overriding factors causing droop, it is evident that droop is objectionable.

A similar line of reasoning will show that heat due to current through a thermostat switching device to a room air conditioner is objectionable since it introduces a temperature variable that shifts the actual control point of the thermostat away from the no-load control point.

It is an object of one aspect of the invention to provide a method of thermostatically controlling heating or cooling equipment to give a minimum variation in the actual control point due to differences in the "on" times as compared to the "off" times of the load.

In accordance with the foregoing aspect of the invention the method comprises the steps of establishing an ambient-temperature-sensing zone; producing a signal function which is responsive to the difference between the temperature in said zone and a selected ambient temperature; utilizing said signal to selectively energize said equipment, said equipment changing the ambient temperature by appropriate algebraic sign to reduce said difference, and, anticipating the change in temperature in said zone due to the energization of said equipment by adding heat of the said algebraic sign to said zone only during such energization and introducing an amount of heat during the "off" times of the signal function that complements the heat produced inherently during the "on" times, thereby minimizing or eliminating droop, and optionally to produce a rise characteristic.

It is an object of another aspect of this invention to provide an electrical thermostat having minimum characteristics.

In accordance with this further object the invention comprises: an ambient-temperature-sensing zone; a temperature-responsive element in said zone; switching means for said equipment, said switching means being connected and responsive to said temperature-responsive element to selectively energize said equipment.

The control means inherently produces heat that varies with the amount and duration of the load current. The novel thermostat described below introduces thermal isolation between the control means and the temperature responsive element additional to the nominal isolation provided by the customary support of the control means. One embodiment of the invention includes a divider that separates the air space between the control device and the temperature sensor into two air spaces, and shields the temperature sensor from the heat developed in the control device. Ideally the shield is a specular reflector.

A preferred embodiment of the invention will now be described with reference to the accompanying drawings in which:

FIG. 1 is a diagram of a thermostat having a heating or cooling anticipator element.

FIG. 2 is a diagram of a thermostat similar to that shown in FIG. 1 but additionally including a negative-droop heating or cooling element.

Referring now to FIG. 1, a pair of lines 1 and 2 provide a single-phase supply from a line source at one end to a load at the other. A snap action switch 3 is inserted into line 1 between the source and the load and the switch 3 opens and closes the supply to the load in response to a bimetallic element 4. The snap action switch 3 is shown as being of the single-pole type, but a double-pole switch may be used. A heat anticipator resistance 5 is connected in parallel across the lines 1 and 2 on the load side of the switch 3. A heat-reflecting shield 6 is disposed between the bimetallic element 4 and the switch 3. The heat shield 6 has an air space between it and the switch 3 and between it and the resistance 5 and the bimetallic element 4. The surface of the heat shield directed towards the switch is provided with a bright reflecting surface. The bimetallic element 4, resistance 5 and heat shield 6 together form a thermalstatic combination.

The ohmic value of resistance 5 is selected in relation to its proximity to the bimetallic element 4, the responsiveness of the latter and that of the switch 3 and the nature and size of the load. The droop deviation is dependent on the relative positions of the heat shield 6 and bimetallic element 4 to the switch 3.

In operation, the ratio of the bimetallic element response to the room temperature change is controlled by the heat anticipator resistor which, in series with the snap action switch and in parallel with the load, impresses a certain temperature bias on the bimetallic element thus reducing the differential temperature characteristics. Further, the control of droop depends upon the correlation of internal heat generated by the switch and the overall temperature responsiveness. The control of droop is thus accomplished by the relative proximity of the four essential elements of the thermostat, i.e. bimetallic element 4, switch 3, heat anticipator resistor 5, and the heat reflecting shield 6 that divides the air space behind the bimetallic element into two laminar air spaces, wherein the reflective functions of the shield are incremental functions of the heat produced by the switch 3 due to the nature and size of the load.

Thermostats built in accordance with the above disclosed embodiment for loads of 5 kw. at 240 V. or 277 V AC exhibit excellent characteristics. An operating differential of 1 F. or less was obtained at midpoint scale at the rated electrical load for a 6° F. per hour temperature change and with the thermostat exposed to an air velocity of 25 feet per minute. A corresponding droop, in accordance with the definition already give, of 1° F. or less was obtained.

Referring now to FIG. 2 there is shown a further embodiment of the invention wherein there is provided a negative droop resistance 7 connected in parallel with the switch 3. The ohmic value of resistance 7 is independent on the size of the load and unlike the heat anticipator resistance 5, resistance 7 dissipates energy only when the load is deenergized.

In operation, this further embodiment closely follows that of FIG. 1 excepting that the thermostat as a whole may be maintained at a temperature slightly above its set value and well within the expected range of ambient temperature. This embodiment permits a further reduction of the droop or even the provision of a droop having negative values, i.e., rise. In connection with the latter a rise characteristic of operation is of considerable value in compensating for cold-wall effect often encountered in domestic heating systems during periods of extremely cold weather. With a proper heating resistor, there is a rise in the actual control point for long "on" times relative to short "off" times, for a given load current, as compared to the control point with the same load under no-load conditions. The higher control point for long "on" time ratios makes the room more comfortable since a person loses more body heat to a cold-wall than to a wall of moderate temperature.

Both of the above disclosed embodiments of the invention are suitable for full-line-voltage operation although it is obvious that providing the line is capable of supplying sufficient electrical energy to operate the heat anticipator resistance, the "load" may in fact be a low power relay indirectly controlling the heating equipment per se.

It will be further appreciated that either of the above-mentioned embodiments may be used to control atmospheric cooling equipment. In this case the resistance in FIG. 1 may be replaced by a thermoelectric cooling element which will artificially reduce the ambient temperature in the zone of the bimetallic element 4 to a temperature slightly above the set temperature and will with the expected range of ambient temperature. Similarly, the resistance 7 in FIG. 2 may be thermoelectric cooling element which will also serve to depress the ambient temperature near the bimetal 4. A reduced temperature differential will be obtained and the droop function will have a negative sign and may be referred to as "rise."

When the thermostat is used for controlling room heating the element 5 which modifies the ambient temperature in the sensing zone is a heating resistor, and the heat that is introduced into the heating zone has a positive algebraic sign. Correspondingly, when element 5 is a thermoelectric cooling element disposed in the temperature-sensing zone of the thermostat then heat is extracted and the algebraic sign of such heat will be understood to be negative.

The embodiments of the invention in which we claim an exclusive property or privilege are defined as follows:

1. A Thermostat for ambient-temperature-modifying equipment, the thermostat having a minimum droop, comprising:
   i. a temperature responsive element in an ambient temperature sensing zone;
   ii. switching means for said equipment, said switching means being separated by an air space from but coupled to and responsive to said temperature-responsive element to energize and deenergize said equipment, said switching means being adapted to carry the operating current of said equipment and inherently developing heat that tends to modify the temperature in said zone;
   iii. a heat shield interposed in the air space between said switching means and said temperature responsive element, said heat shield subdividing said space into two separate air spaces opposite sides thereof; and
   iv. a heating element for developing heat that reaches said zone, said thermostat including switching means for energizing said heating element in alternation with said equipment to raise the temperature control point in effect during periods of energization as compared to the temperature control point in effect during sustained nonenergization of the equipment, thereby to reduce droop or actually produce a rise.

2. A thermostat in accordance with claim 1 wherein said heating element is connected in parallel with said switching means.

3. A thermostat for controlling the operation of atmospheric-temperature-modifying equipment to give a minimum of droop or rise in the atmospheric ambient temperature comprising:
   i. a pair of supply lines for feeding load current to said equipment;
   ii. a temperature-sensing element responsive to the ambient temperature in a temperature-sensing zone;
   iii. switching means in at least one of said lines, said switching means being coupled and responsive to said element, said switching means alternately supplying and interrupting the supply of current to said equipment, said switching means inherently developing heat due to load current therethrough and the heat thus developed tending to produce droop; and
   iv. a heating element energized under control of said switching means when the latter interrupts load current to the equipment for inversely supplying heat in the thermostat to complement the effect on the temperature-responsive element of the heat developed in the switching means during the periods when the equipment is energized.

4. A thermostat in accordance with claim 3, wherein said heating element is a resistor in parallel with the switching means so as to be shunted by the switching means when the latter is closed and being in operation when the switching means is open.

5. A thermostat in accordance with claim 3, wherein said switching means comprises a snap switch and wherein said temperature-sensing element comprises a bimetal mechanically coupled to said snap switch.

6. A thermostat for ambient-temperature-modifying equipment, the thermostat having a minimum droop, comprising:
   i. a temperature-responsive element in an ambient-temperature-sensing zone;
   ii. switching means for said equipment, said switching means being separated by an air space from but coupled to and responsive to said temperature-responsive element to energize and deenergize said equipment, said switching means being adapted to carry the operating current of said equipment and inherently developing heat that tends to modify the temperature in said zone;
   iii. a heat shield interposed in the air space between said switching means and said temperature-responsive element, said heat shield subdividing said space into two separate air spaces at opposite sides thereof,
   iv. a resistance element in said ambient-temperature-sensing zone, and
   v. said thermostat including means for selectively energizing said resistance element concurrently with said equipment to reduce the temperature difference in said zone between the prevailing ambient temperature in the zone and a selected ambient temperature.

7. A thermostat for ambient-temperature-modifying equipment, the thermostat having a minimum droop, comprising:
   i. a temperature-responsive bimetal in an ambient-temperature-sensing zone;
   ii. a snap-acting switch for said equipment, said switch being separated by an air space from but coupled to and responsive to said temperature-responsive bimetal to energize and deenergize said equipment, said snap-acting switch being adapted to carry the operating current of said equipment and inherently developing heat that tends to modify the temperature in said ambient-temperature-sensing zone;
   iii. a heat shield interposed in the air space between said switch and said temperature-responsive bimetal, said heat shield subdividing said space into two separate air spaces at opposite sides thereof, and
   iv. a resistance element in said ambient-temperature-sensing zone,
   v. said thermostat including means for selectively energizing said resistance element concurrently with said equipment to reduce the temperature difference in said zone between the prevailing ambient temperature in the zone and a selected ambient temperature.

8. A thermostat for ambient-temperature-modifying equipment, the thermostat having a minimum droop, comprising:
   i. a temperature-responsive element in an ambient-temperature-sensing zone;
   ii. switching means for said equipment, said switching means being separated by an air space from but coupled to and responsive to said temperature-responsive element to energize and deenergize said equipment, said switching means being adapted to carry the operating current of said equipment and inherently developing heat that tends to modify the temperature in said zone;

iii. and a heat shield interposed in the air space between said switching means and said temperature responsive element, said heat shield subdividing said space into two separate air spaces at opposite sides thereof, said heat shield having a bright reflecting surface directed toward the switching means.

9. A method of thermostatically controlling the operation of atmospheric-temperature-modifying equipment to give a minimum of droop or a rise in the atmospheric ambient temperature comprising the steps of:

i. establishing an ambient-temperature-sensing zone:
ii. producing a signal function which is responsive to a difference between the temperature of said zone and a selected ambient temperature;
iii. utilizing said signal to energize said equipment when said temperature difference is excessive, said equipment modifying the ambient atmospheric temperature in the appropriate direction to reduce said difference:
iv. producing a first heating effect that raises the ambient temperature in said zone incidental to step iii. during energized periods of the equipment and as a result of the load current of such equipment; and
v. producing a supplemental heating effect during the full periods of time between said energized periods to raise the ambient temperature in said zone for at least compensating for interruptions of said first heating effect.